United States Patent
Sheedy et al.

(10) Patent No.: US 8,407,215 B2
(45) Date of Patent: Mar. 26, 2013

(54) TEXT ANALYSIS TO IDENTIFY RELEVANT ENTITIES

(75) Inventors: Paul Sheedy, Dublin (IE); Dan Cristian Marinescu, Puteaux (FR); Alexis L. Naibo, Levallois-Perret (FR); Gilles Vergnory-Mion, Vaucresson (FR); Adrien Grand, Cesny-aux-Vigres (FR)

(73) Assignee: SAP AG, Walldorf (DE)

( * ) Notice: Subject to any disclaimer, the term of this patent is extended or adjusted under 35 U.S.C. 154(b) by 131 days.

(21) Appl. No.: 12/965,200

(22) Filed: Dec. 10, 2010

(65) Prior Publication Data
US 2012/0150852 A1 Jun. 14, 2012

(51) Int. Cl.
*G06F 7/00* (2006.01)
*G06F 17/30* (2006.01)

(52) U.S. Cl. ........................................ 707/726; 707/749

(58) Field of Classification Search .................. None
See application file for complete search history.

(56) References Cited

U.S. PATENT DOCUMENTS

| | | | | |
|---|---|---|---|---|
| 5,832,480 A * | 11/1998 | Byrd et al. | | 1/1 |
| 6,018,738 A * | 1/2000 | Breese et al. | | 707/749 |
| 6,839,665 B1 * | 1/2005 | Meyers | | 704/9 |
| 6,970,881 B1 * | 11/2005 | Mohan et al. | | 1/1 |
| 7,627,550 B1 * | 12/2009 | Adams et al. | | 1/1 |
| 7,996,379 B1 * | 8/2011 | Jain | | 707/706 |
| 2002/0174124 A1 * | 11/2002 | Haas et al. | | 707/100 |
| 2002/0175948 A1 * | 11/2002 | Nielsen et al. | | 345/781 |
| 2003/0037041 A1 * | 2/2003 | Hertz | | 707/1 |
| 2004/0205548 A1 * | 10/2004 | Bax et al. | | 715/513 |
| 2004/0268239 A1 * | 12/2004 | Fujita | | 715/513 |
| 2005/0038671 A1 * | 2/2005 | Naeymi-Rad et al. | | 705/2 |
| 2005/0246325 A1 * | 11/2005 | Pettinati et al. | | 707/3 |
| 2006/0122978 A1 * | 6/2006 | Brill et al. | | 707/3 |
| 2006/0149710 A1 * | 7/2006 | Koningstein et al. | | 707/3 |
| 2006/0271531 A1 * | 11/2006 | O'Clair et al. | | 707/5 |
| 2007/0011183 A1 * | 1/2007 | Langseth et al. | | 707/101 |
| 2007/0112748 A1 * | 5/2007 | Angell et al. | | 707/4 |
| 2007/0239697 A1 * | 10/2007 | Chen et al. | | 707/4 |
| 2008/0005090 A1 * | 1/2008 | Khan et al. | | 707/4 |
| 2008/0005106 A1 * | 1/2008 | Schumacher et al. | | 707/6 |
| 2008/0069448 A1 * | 3/2008 | Turner et al. | | 382/190 |
| 2008/0104071 A1 * | 5/2008 | Pragada et al. | | 707/6 |

(Continued)

OTHER PUBLICATIONS

Knowledge Management, Data Mining, and Text Mining in Medical Informatics, Chen et al. Medical Informatics, Chapter 1, p. 3-34, 2005.*

(Continued)

*Primary Examiner* — Augustine K Obisesan
(74) *Attorney, Agent, or Firm* — Buckley, Maschoff & Talwalkar LLC

(57) ABSTRACT

A system includes a data structure comprising a plurality of mesh entities, the data structure associating each of the plurality of mesh entities with a respective name and a respective one or more attribute values, and associating each of the plurality of mesh entities with one or more relations to one or more other ones of the plurality of mesh entities. Some aspects include reception of a file comprising text, identification of text entities from the text, identification of first mesh entities from the plurality of mesh entities based on the identified text entities, determination, for each of the first mesh entities, of a name and one or more attribute values, and determination of a relevance associated with each identified text entity based on the determined name and one or more attribute values.

10 Claims, 13 Drawing Sheets

U.S. PATENT DOCUMENTS

| | | | |
|---|---|---|---|
| 2008/0215565 A1* | 9/2008 | Sun et al. | 707/5 |
| 2009/0164449 A1* | 6/2009 | Huang | 707/5 |
| 2009/0187553 A1* | 7/2009 | Sarkar et al. | 707/5 |
| 2009/0198686 A1* | 8/2009 | Cushman et al. | 707/5 |
| 2009/0216563 A1* | 8/2009 | Sandoval et al. | 705/3 |
| 2009/0271404 A1* | 10/2009 | Bayliss | 707/6 |
| 2010/0205198 A1* | 8/2010 | Mishne et al. | 707/759 |
| 2010/0250598 A1* | 9/2010 | Brauer et al. | 707/780 |

OTHER PUBLICATIONS

Toward Entity Retrieval over Structured and Text Data, Sayyadian et al, Proceedings of the Joint Workshops on XML, IR, and DB, p. 47-54, 2004.*

Constructing Information Networks from Text Documents, Jursic et al., Workshop on Explorative Analytics of Information Networks, pp. 23-38, 2009.*

* cited by examiner

200

Entities

| Entity_id | Type | Name | Location |
|---|---|---|---|
| 10 | person | Jean Doe | Paris |
| 11 | product | ERP | --- |
| 12 | person | Steve Job | San Francisco |
| 13 | company | SBP OBJ | Paris |
| 14 | company | SBP AG | Walldorf |
| 15 | person | Thomas Mueller | Berlin |
| 16 | company | Prophet | San Francisco |
| 17 | person | Dieter Hopp | Walldorf |

250

Relations

| Source_id | Target_id | Type |
|---|---|---|
| 2 | 1 | mgr_managee |
| 2 | 3 | contact |
| 1 | 3 | friend |
| 3 | 1 | friend |
| 3 | 6 | contact |
| 6 | 5 | employeeOf |
| 4 | 5 | partner |
| 5 | 4 | partner |

*FIG. 2*

TEXT ANALYSIS TO IDENTIFY RELEVANT ENTITIES

BACKGROUND

A significant portion of an organization's knowledge base is encapsulated by text within unstructured sources, such as word processing documents and electronic mail. To facilitate analysis of this text, text analysis tools have been developed to extract specific features (e.g., sentences, paragraphs, clauses, entities) from unstructured text sources. These tools may also assign types to the extracted features using pre-defined catalogues of recognized terms. The utility of these tools is therefore strongly linked to the quality and relevance of the catalogues.

For example, a conventional text analysis tool may extract text entities such as people, places, organizations, dates, countries, etc. The tool may employ a generic catalogue which allows it to identify general entity types without requiring setup or manual configuration. To enhance the quality and relevance of the extracted text entities, users may manually generate custom catalogues for extracting custom entities such as project names, internal document names, domain-specific terminology, numbers, etc. Generation and maintenance of these custom catalogues can be costly and error-prone.

Systems are desired to provide improved extraction of text entities while addressing shortcomings in conventional approaches. For example, systems are desired which exhibit reduced reliance on custom catalogues.

BRIEF DESCRIPTION OF THE DRAWINGS

FIG. 2 includes tabular representations of portions of a data structure according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
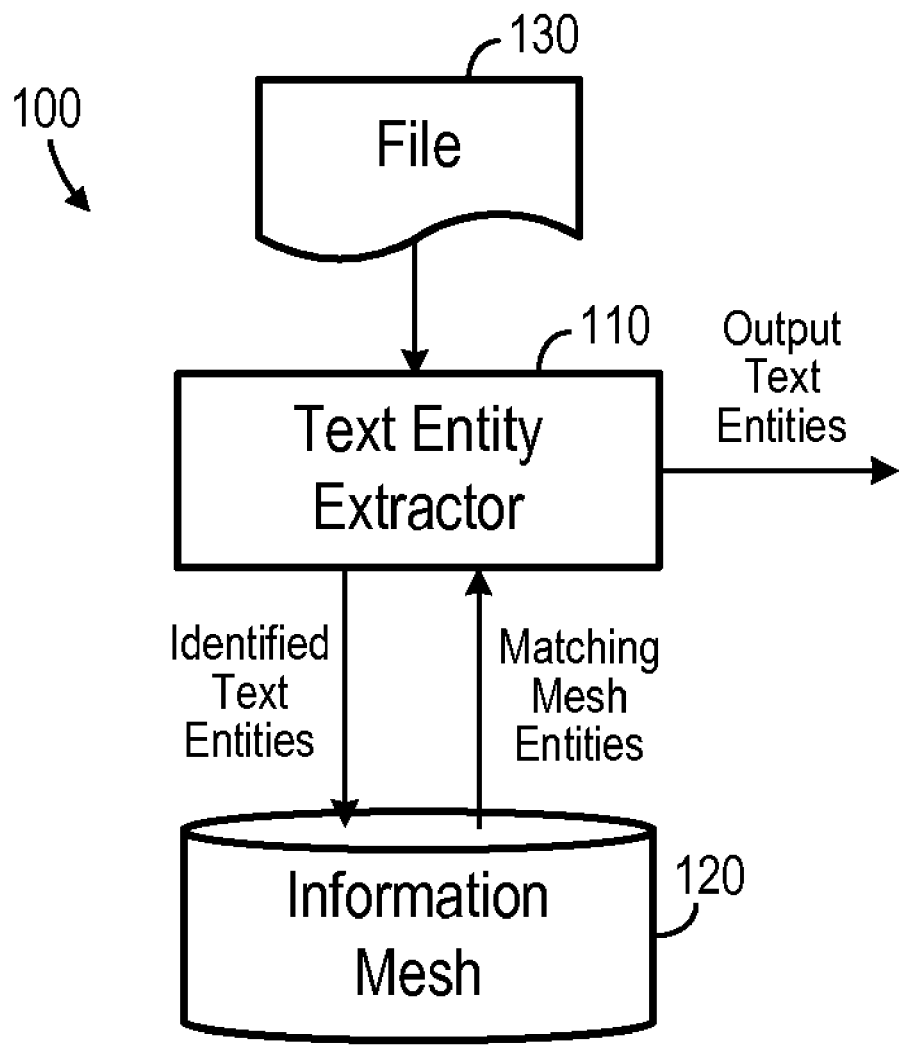
FIG. 1 is a block diagram of a system according to some embodiments.

FIG. 1 is a block diagram of environment 100. Environment 100 represents a logical architecture for describing some embodiments, and actual implementations may include more or different components arranged in any manner. Environment 100 may be implemented using any number of computing devices, and one or more processors within environment 100 may execute program code to cause corresponding computing devices to perform processes described herein. For example, environment 100 may be implemented by a single computing device.

Generally, each logical component described herein may be implemented by any number of devices coupled via any number of public and/or private networks. Two or more of such devices may be located remote from one another and may communicate with one another via any known manner of network(s) and/or via a dedicated connection. Moreover, each logical component may comprise any number of hardware and/or software elements suitable to provide the functions described herein as well as any other functions.

Environment 100 includes text entity extractor 110, information mesh 120 and file 130. Text entity extractor 110 may comprise a software tool as described above. Accordingly, text entity extractor 110 may identify text entities from file 130 based on any entity extraction systems that are or become known. For example, text entity extractor 110 may comprise a stemmer for identifying normal forms of text entities within file 130, and an extractor for associating each of the normal forms with a corresponding entity type. Embodiments are not limited thereto.

Information mesh 120 may comprise a storage device (e.g., one or more hard disks) storing a data structure. Information mesh 120 may refer to the data structure itself, without regard to the storage mechanism thereof. The data structure includes a plurality of mesh entities, with each of the plurality of mesh entities being associated with a respective name and a respective one or more attributes. Moreover, each of the plurality of mesh entities is associated with one or more relations to one or more other ones of the plurality of mesh entities.

A mesh entity may comprise a person, a company, a location, or any other subject which may be associated with a name and attributes. The mesh entities, names, attributes, and relations of information mesh 120 may be represented within information mesh 120 in any suitable manner. For example, each mesh entity of information mesh 120 may be represented by a database record including its name and attributes. In some embodiments, each record of information mesh 120 corresponds to one mesh entity and one data source, such that each record includes data (e.g., a name and attributes) associated with a mesh entity and received from a single data source. Consequently, a mesh entity may be associated with more than one record of information mesh 120 if data associated with the entity is received from more than one data source.

The mesh entities, names, attributes, and relations of information mesh 120 may be received from any types of data sources and in any manner or format. Non-exhaustive examples of such data sources include enterprise applications (e.g., SAP CRM, SalesForce.com), social networks (e.g., Facebook, LinkedIn), groupware data (e.g., Microsoft Outlook files), and any other suitable data store and/or feed. In this regard, information mesh 120 may store data provided by heterogeneous sources in multiple formats at various intervals.

The relations associated with the mesh entities of information mesh 120 may be provided by their respective data sources and/or may be determined based on the data of information mesh 120. Embodiments are not limited to any types of relations or to any particular system for determining relations among mesh entities.

Information mesh 120 may be associated with a particular user or group of users. For example, within an enterprise, a first user may be associated with a first information mesh and a second user may be associated with a second information mesh. The first information mesh and the second information mesh may include some common mesh entities, attribute values and/or relations (e.g., received from a CRM system of the enterprise), but may also include different mesh entities, attribute values and/or relations (e.g., received from the first user's and second user's respective social networking accounts).

FIG. 2 presents tabular representations of portions of information mesh 120 according to some embodiments. The representations include Entities table 200 and Relations table 250. Embodiments may store the information of tables 200 and 250 in more than two tables or less than two tables. Embodiments are also not limited to database tables.

Each record of Entity table 200 includes attribute values for a given mesh entity. The values specify an Entity_id, Type and Name, and also specify various attributes of the entity, such as Location, etc. Some embodiments of information mesh 120 may include any suitable attributes that are or become known. Some attributes may be applicable to some mesh entities but not to others, depending on the entity type. For example, a person may be associated with a value of a Height attribute, while a company may be associated with a value of a Country of Incorporation attribute.

Each record of Relations table 250 associates a mesh entity (identified by a value of the Source_id field) with another mesh entity (identified by a value of the Target_id field). Relations table 250 of FIG. 2 also indicates a Type of each relation, though embodiments are not limited thereto. As mentioned above, the relations associated with the mesh entities of information mesh 120 may be provided by data sources which provide attribute values for the mesh entities and/or may be determined by information mesh 120 based on the data stored therein.

Returning to environment 100, file 130 may comprise an electronic mail message, a word processing document, a .txt file, an ASCII file, a Portable Document Format document, a spreadsheet, an image of any of the above, or any other type of electronic file from which text may be identified.

According to some embodiments, text entity extractor 110 identifies text entities from file 130 and determines the relevance of the identified text entities based on information mesh 120. As will be described below, the identified text entities may be used to identify mesh entities from information mesh 120, and information associated with the identified mesh entities is then used to determine a relevance of each identified text entities.

Figure 3:
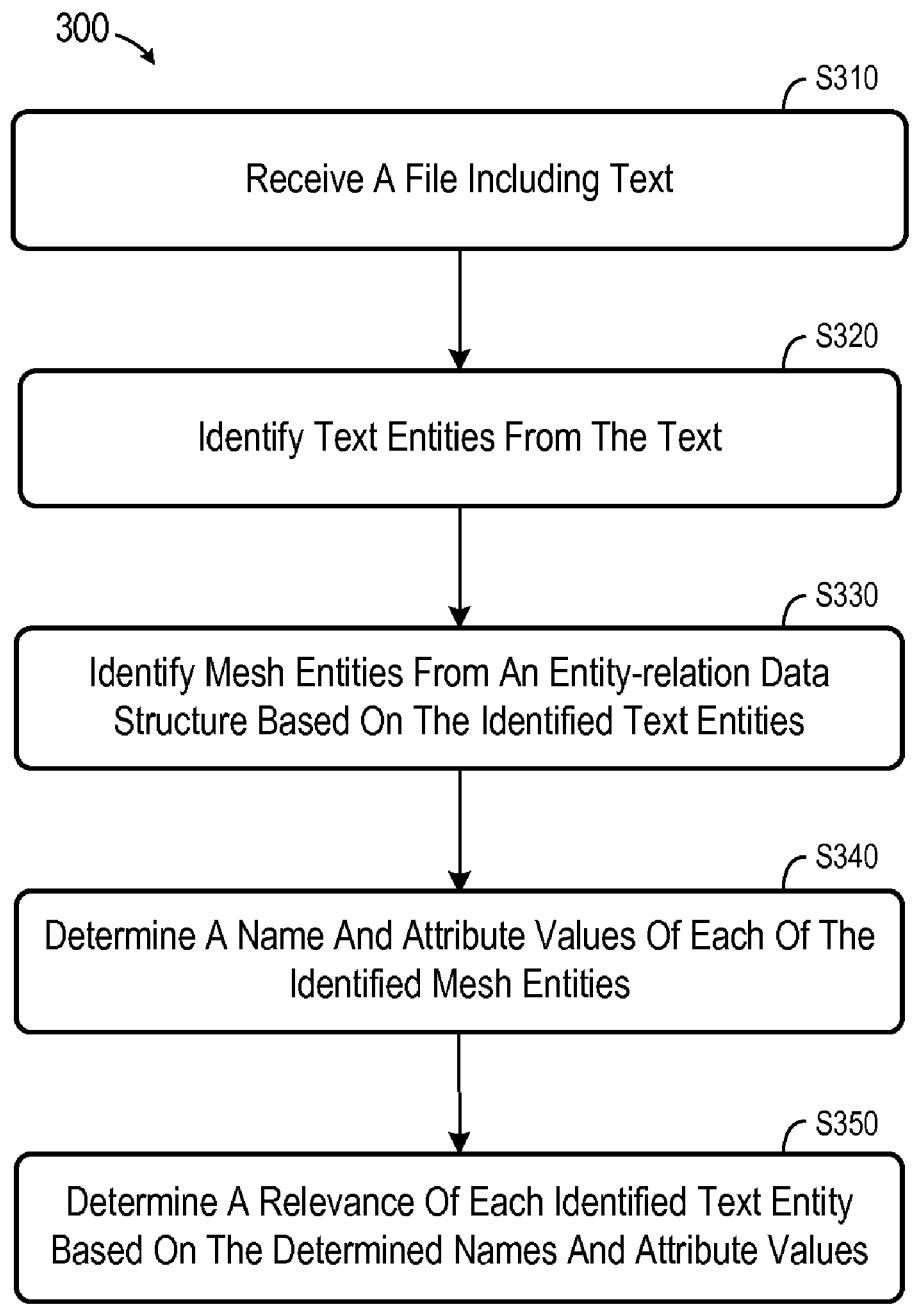
FIG. 3 is a flow diagram of a process according to some embodiments.

FIG. 3 is a flow diagram of process 300 according to some embodiments. Process 300, and all other processes described herein, may be executed by hardware and/or embodied in program code stored on a tangible computer-readable medium. Examples of process 300 will be described below with respect to text-entity extractor 110, but examples are not limited thereto.

A file including text is initially received at S310. The file may be received from any remote or local storage device and may conform to any electronic format, including those mentioned above. The file may comprise a hardcopy in some embodiments. According to some embodiments, the file is submitted to a system executing process 300 in order to identify text entities mentioned in the file which bear some relevance to the data of information mesh 120.

Text entities are identified from the file at S320. The text entities may be identified using any suitable system that is or becomes known. Identification of the text entities may depend on a built-in catalog as described in the Background. The catalog may define entities and a normal form associated with each entity. The catalog may further define variants of each normal form, i.e., other pieces of text that are known to denote the same entity. For instance, an entity may represent the United States. The normal form for this entity may be the string "The United States of America". Variants of the normal form be "U.S.", "The US", "Uncle Sam", "America", etc.

In one example of S320, text entity extractor 110 uses such a catalog to convert the text to a base form (i.e., stemming), identify any variants (including the normal form) of any known entity within the converted text, and return an indication of the identified entities, which are referred to herein as "identified text entities". Embodiments are not limited to this example. For instance, text entity extractor 110 may simply search the text for names of entities which are present in the catalog.

Next, at S330, mesh entities of an entity-relation data structure are identified based on the identified text entities. The entity-relation data structure may comprise an information mesh as described above. More generally, the entity-relation data structure may be any data structure including a plurality of mesh entities and associating each of the plurality of mesh entities with a respective name and a respective one or more attributes, and also associating each of the plurality of mesh entities with one or more relations to one or more other ones of the plurality of mesh entities.

FIG. 1 illustrates transmission of Identified Text Entities to information mesh 120. Information mesh 120 may comprise a search engine which executes a search for mesh entities of information mesh 120 based on the identified text entities at S330. Any suitable search algorithm may be employed. In this regard, information mesh 120 may be associated with a search index to facilitate searching of the data thereof. The results of the search may be returned to extractor 110 as mesh entity Ids, and are illustrated in FIG. 1 as Matching Mesh Entities.

Information mesh 120 may include public and private mesh entities. Moreover, each user may be associated with a different perspective of information mesh 120. That is, the search results of S330 may depend upon the user under which the search is conducted.

For each mesh entity identified at S330, a name and attribute values are determined at S340. In some embodiments, the name and attribute values are determined by querying information mesh 120 using mesh entity Ids.

A relevance of each identified text entity is then determined at S350. The relevance is determined based on the mesh entity names and attribute values determined at S340. According to some embodiments, the relevance of a particular identified text entity is determined based on the name and attributes of each mesh entity which was identified at S330 based on the particular identified text entity.

At S330, each mesh entity that is identified based on a text entity may be assigned a score by the aforementioned search engine. Accordingly, as an alternative to S340 and S350, the relevance of an identified text entity may be determined based on the scores assigned to its associated mesh entities.

Figure 4:
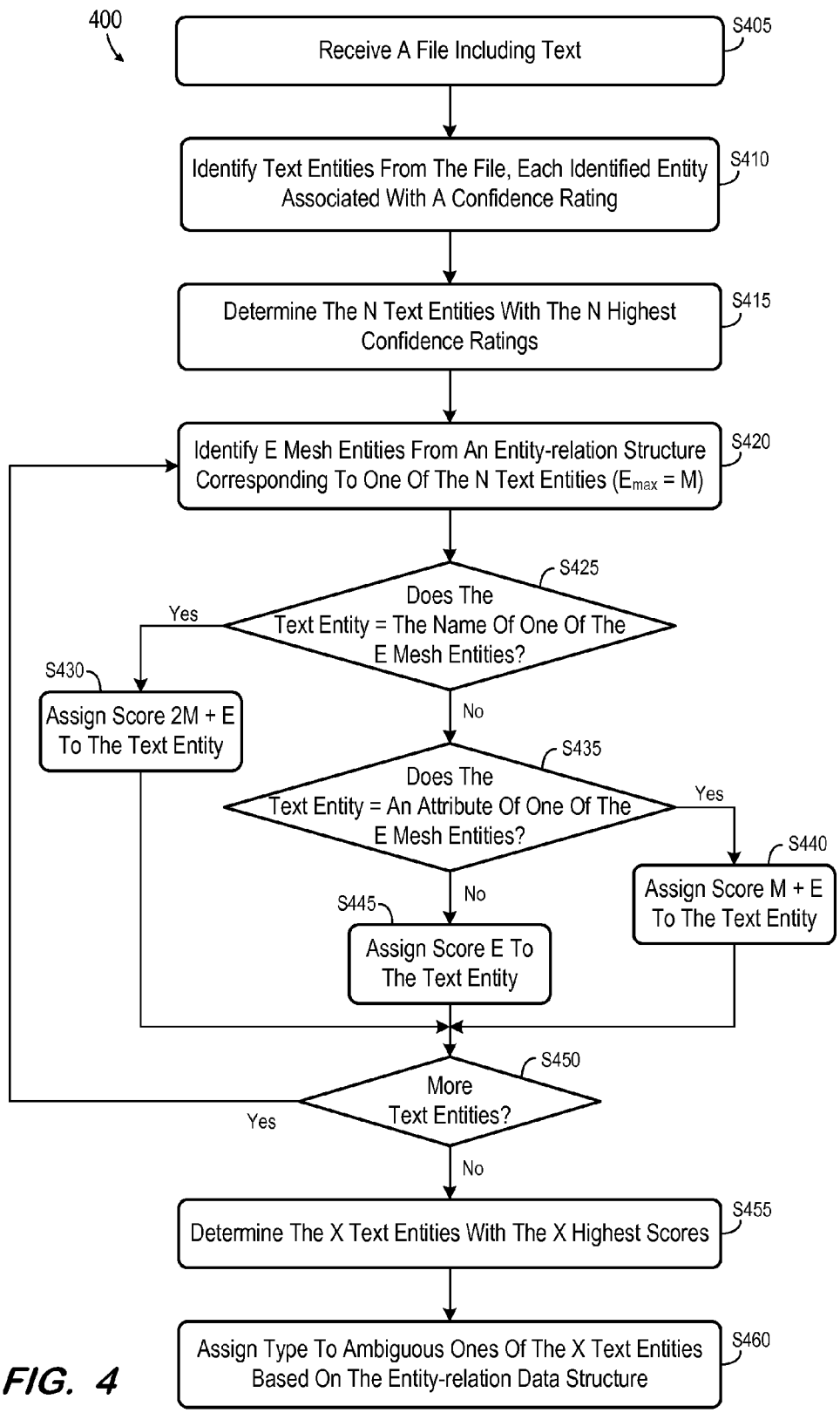
FIG. 4 is a flow diagram of a process according to some embodiments.

FIG. 4 is a flow diagram of process 400 according to some embodiments. Process 400 may comprise an implementation of process 300. More particularly, process 400 includes further detail regarding the determination of relevances according to some implementations of S350. Embodiments are not limited to the specifics of process 400.

A file including text is received at S405 as described above with respect to S310. Text entities are then identified from the file at S410. As is known in the art, the identification process may include associating each identified entity with a confidence rating. The confidence rating of an identified text entity provides an indication of the likelihood that the identified text entity is actually mentioned in the text.

The identified text entities having the N highest confidence ratings are determined at S415. N may be any integer (e.g., 50), and may be selected in order to reduce the amount of computing resources required by process 400. In operation, N may be greater than the number of identified entities, so all identified text entities are determined at S415. In some embodiments, S415 comprises ranking the identified text entities in order of their associated confidence ratings and determining a particular percentage (e.g., top 30%) of the ranked text entities.

Next, at S420, mesh entities of an entity-relation data structure are identified based on the one of the determined text entities. In some embodiments, the determined text entity is forwarded to information mesh 120 as a query, information mesh 120 is searched based on the query, and search results are returned including zero or more (i.e., E) mesh entity Ids. According to known searching algorithms, each search result (i.e., mesh entity Id) is associated with a relevance score. In some embodiments, S420 identifies only the top M (e.g., 100) mesh entity Ids, ordered by decreasing relevance score (i.e., $E_{MAX}=M$).

At S425, it is determined whether the identified text entity is also the name of one of the mesh entities identified at S420. For example, the determination at S425 is positive if the text entity is "John Doe" and the Name associated with any one of the identified mesh entities is also "John Doe". In such a case, flow proceeds to S430 to assign a score to the identified text entity. According to the present embodiment, the score is 2M+E, which, using the examples above, is 250.

Flow then continues to S450 to determine if any of the identified text entities have not yet been assigned a score. If so, flow returns to S420 to identify E mesh entities corresponding to one of the identified text entities which has not yet been associated with a score. Assuming that the identified text entity is not the name of one of the mesh entities identified at S420, it is then determined at S435 whether the identified text entity is an attribute value of any of the identified mesh entities. For example, the determination at S435 may be positive if the identified text entity is "Walldorf" and the value of the Location attribute of one of the identified mesh entities is also "Walldorf". If the determination is positive, flow proceeds to S440 to assign the score M+E to the identified text entity. Using the examples above, this score is 150.

Next, it is again determined at S450 whether any of the identified text entities have not yet been assigned a score. Assuming this is true, flow again returns to S420 to identify E mesh entities corresponding to one of the identified text entities which has not yet been associated with a score.

Flow continues to S445 if the determinations at S425 and S435 are negative. Therefore, if the identified text entity is neither a name nor an attribute value of any of mesh entities identified as corresponding to the text entity at S420, a score E (e.g., 50) is assigned to the text entity. In this regard, fuzzy search algorithms may be employed at S420 so that a mesh entity may be identified even if the corresponding identified text entity is neither a name nor an attribute value of the mesh entity.

Embodiments are not limited to the particular scoring formulas described above. According to some embodiments, the score assigned at S430 is greater than the score assigned at S440, which in turn is greater than the score assigned at S445.

Flow proceeds from S450 to S455 once a score has been assigned to each text entity determined at S415. The text entities having the X highest scores are determined at S455. X may be any integer (e.g., 20), and may be greater than the number of text entities, in which case all text entities are determined at S455. S455 may comprise ranking the text entities in order of their assigned scores and determining a particular percentage (e.g., top 50%) of the ranked text entities.

Some embodiments of process 400 further include assigning a type to ambiguous ones of the X text entities based on the entity-relation data structure. In this regard, each text entity identified at S410 may be associated with a type according to known entity extraction systems. Such types may include Person, Company, Place, Product, etc. Some entities (e.g., Paris) may be ambiguous in that they may be associated with more than one type (i.e., Person and Location). Therefore, S460 comprises assigning a type to each ambiguous one of the X text entities based on the type assigned to a mesh entity having the name of the ambiguous text entity.

The X text entities may consist of entities mentioned in file 130 which are particularly relevant to information mesh 120. The X text entities may be used for any desired purpose. For example, the X text entities may be used in a query of a data source in order to locate information which is relevant to file 130 and, advantageously, which is also relevant to information mesh 120 (and to a user or users with which information mesh 120 is associated).

Figure 5:
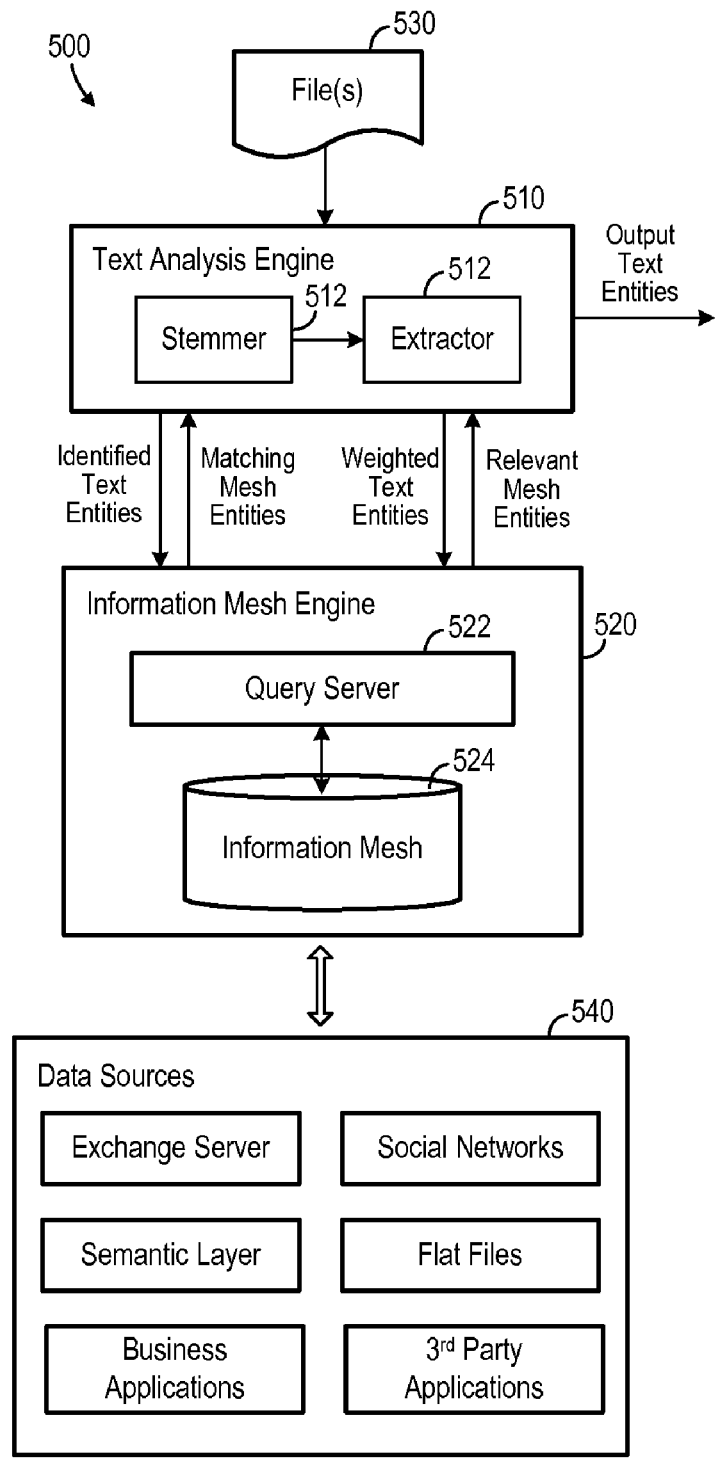
FIG. 5 is a block diagram of a system according to some embodiments.

FIG. 5 is a block diagram of environment 500 according to some embodiments. Environment 500 may comprise an implementation of environment 100, but is not limited thereto. Similarly, implementations of environment 100 may differ from environment 500.

Text analysis engine 510 may perform functions attributed to text entity extractor 110 herein. Text analysis engine 510 includes stemmer 512 for stemming text of file(s) 530 and extractor 514 for identifying text entities from the stemmed text. As described above, stemmer 512 and/or extractor 514 may perform their functions using a built-in catalog of engine 510.

FIG. 5 illustrates transmission of Identified Text Entities to information mesh engine 520 and reception of Matching Mesh Entities therefrom. Accordingly, text analysis engine 510 may execute process 300 and/or process 400 according to some embodiments. Information mesh engine 520 includes query server 522 to receive, execute and respond to the queries described above with respect to process 300 and/or process 400. The queries may be executed against an index of information mesh 524 in some embodiments. Information mesh 524 may comprise a data structure as described above with respect to information mesh 120.

Data sources 540 provide data to information mesh engine 520 for storage in information mesh 524. Embodiments are not limited to the sources illustrated within data sources 540. The data may be provided to information mesh engine 520, processed, and stored in information mesh 524 in any suitable manner.

FIG. 5 also illustrates the transmission of Weighted Text Entities from text analysis engine 510 to information mesh engine 520, and the transmission of Relevant Mesh Entities from information mesh engine 520 to text analysis engine 510 in response. According to some embodiments, this process occurs after the determination of relevant text entities by process 300 or process 400.

Figure 6:
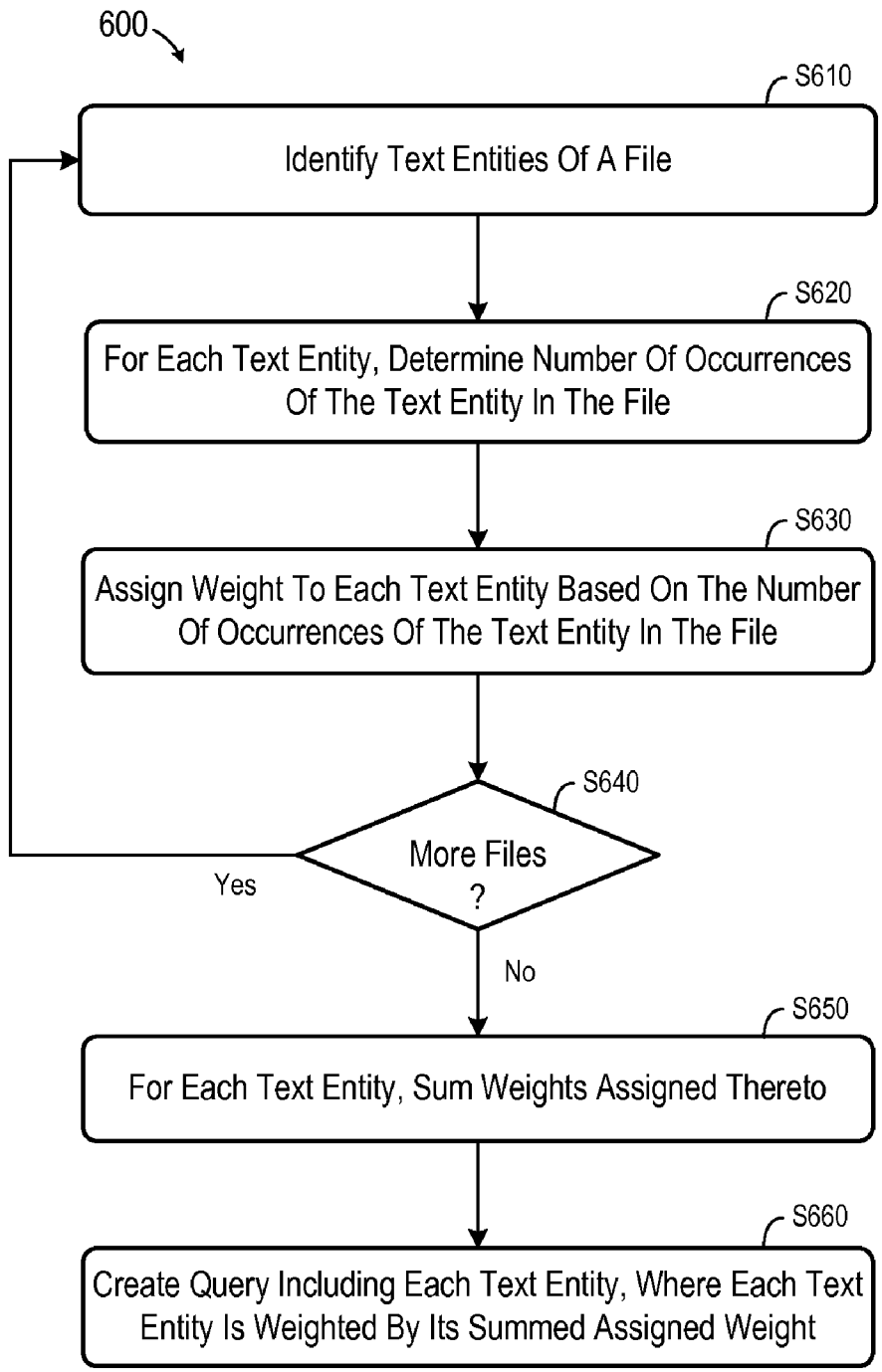
FIG. 6 is a flow diagram of a process according to some embodiments.

FIG. 6 is a flow diagram of process 600 which may be combined with process 300 or process 400 according to some embodiments, and as illustrated in FIG. 5. Specifically, text entities of a file are identified at S610. The text entities may comprise text entities identified based on their respective relevances as determined at S350 (e.g., the text entities having the top 20 relevance scores), or the X text entities determined at S455 of process 400. According to some embodiments, the text entities are identified at S610 using known techniques such as those described with respect to S320. In the latter regard, some embodiments of process 600 do not include process 300 or process 400.

Figure 7:
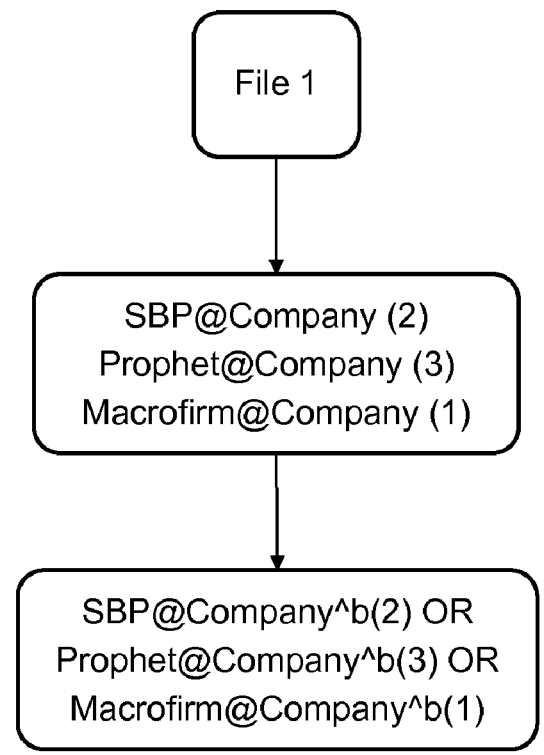
FIG. 7 illustrates creation of a query according to some embodiments.

The number of occurrences of each text entity in the file is determined at S620. FIG. 7 illustrates S620 according to some embodiments. The text entities SBP@Company, Prophet@Company and Macrofirm@Company have been identified from File 1 at S610. "@Company" indicates that each text entity has been assigned the Company type by text analysis engine 510. Type assignment is a typical feature of text analysis systems, but this feature is not required embodiments of process 600. If the feature were omitted, the identified text entities could be represented by "SBP", "Prophet" and "Macrofirm".

As shown in FIG. 7, it has been determined that the text entity SBP@Company occurs twice in file 1, the text entity Prophet@Company occurs three times in file 1 and the text entity Macrofirm@Company occurs once in file 1. A weight is then assigned to each text entity at S630 based on the determined number of occurrences of the text entity.

According to the present example, the weight is determined by a Boost function as illustrated in FIG. 7. As shown, the weight assigned to a text entity increases as the number of occurrences increase, with a limit of one. Embodiments are not limited to the particular illustrated function.

The weight assigned to a text entity based on z occurrences will be denoted as $\hat{b}(z)$. Accordingly, the weighted text entities of the present example may be represented as SBP@Company$\hat{b}(2)$, Prophet@Company$\hat{b}(3)$ and Macrofirm@Company$\hat{b}(1)$.

At S640, it is determined whether additional files are to be processed by process 600. Assuming only a single file as illustrated in FIG. 7, flow proceeds to S650. The weights assigned to each text entity are summed at S650. Since only one weight has been assigned to the text entities of the present example, the weights remain as described above (i.e., SBP@Company$\hat{b}(2)$, Prophet@Company$\hat{b}(3)$ and Macrofirm@Company$\hat{b}(1)$).

A query is created at S660. The query includes each text entity as a search term, with each text entity weighted by its summed assigned weight. FIG. 7 shows such a query according to some embodiments. The weighted text entities are joined with the OR operator.

According to some embodiments, the query may be passed to information mesh engine 520 to identify mesh entities which are relevant to the file. The weightings indicate the relative importance of each search term and therefore the search results are influenced thereby.

Returning to process 600, it will now be assumed that three files have been received for processing. For example, file 1 may comprise an electronic mail message, while files 2 and 3 are attachments thereto, each of which includes text. Assuming that file 1 has been processed at S610 through S630 as described above, flow proceeds through S640 and returns to S610 to identify text entities of file 2. The number of occurrences of each identified text entity within file 2 is determined at S620, and a weight is assigned to each text entity at S630 based on its number of occurrences.

Figure 9:
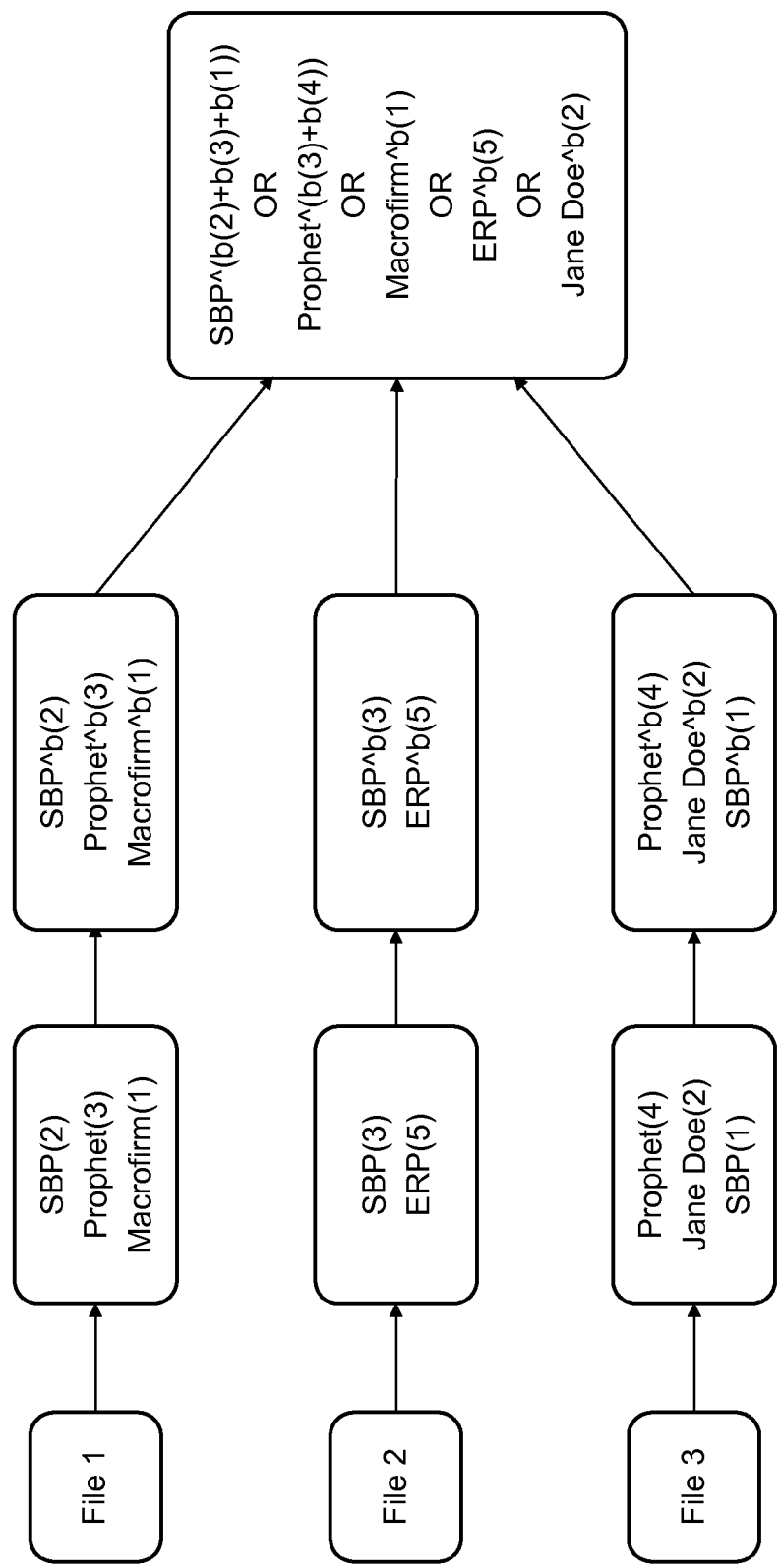
FIG. 9 illustrates creation of a query according to some embodiments.

FIG. 9 illustrates the identification of text entities SBP, Prophet and Macrofirm within file 1 and their associated number of occurrences (i.e., 2, 3 and 1). According to the FIG. 9 example, the text entities are identified without reference to their respective types. Also illustrated is the identification of text entities SBP and ERP within file 2, which are determined to occur 3 and 5 times, respectively, and corresponding weightings $\hat{b}(3)$ and $\hat{b}(5)$ assigned thereto at S630.

At S640, it is determined that another file exists (i.e., file 3). Flow therefore proceeds again through S610 to S630 to identify text entities, determine the number of occurrences of each text entity, and assign weights. The entities, occurrences and weights of file 3 are also illustrated in FIG. 9.

Figure 8:
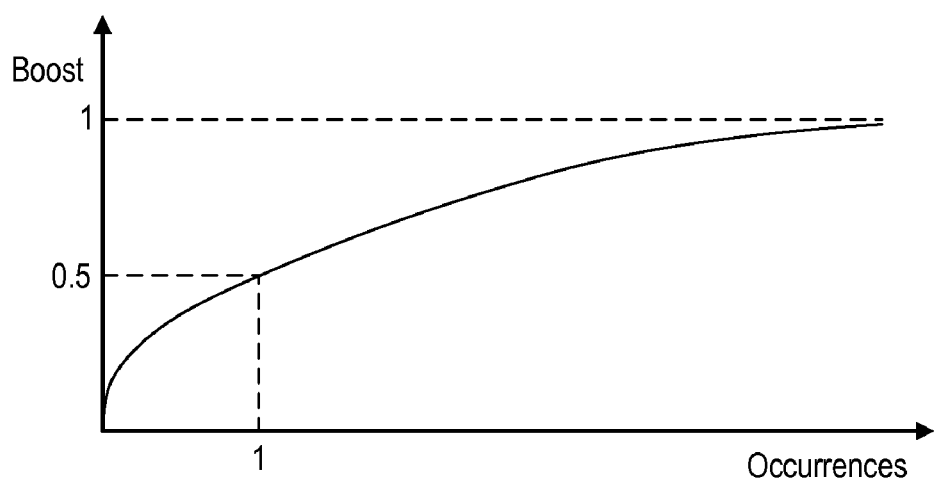
FIG. 8 is a diagram illustrating a weighting function according to some embodiments.

After file 3 is processed, flow proceeds from S640 to S650 to sum the weights assigned to each text entity. Text entities which occur in two or more files (e.g., SBP, Prophet) will have been assigned two or more weights during repeated execution of S630. The assigned two or more weights are summed at S650. For example, the summed weights for text entity SBP of FIG. 9 are $\hat{}((b(2)+b(3)+b(4))$, while the summed weights for text entity Prophet are $\hat{}((b(3)+b(4))$. By nature of the Boost function of FIG. 8 and the summing of weights as described, an occurrence of a text entity in an additional file provides a greater weight than an additional occurrence of the text entity in a single file.

As described above, a query is created at S660 including each text entity as a search term, with each text entity weighted by its summed assigned weight. FIG. 9 shows such a query created according to the present example, including each text entity weighted by its summed assigned weight and joined with the OR operator.

Figure 10:
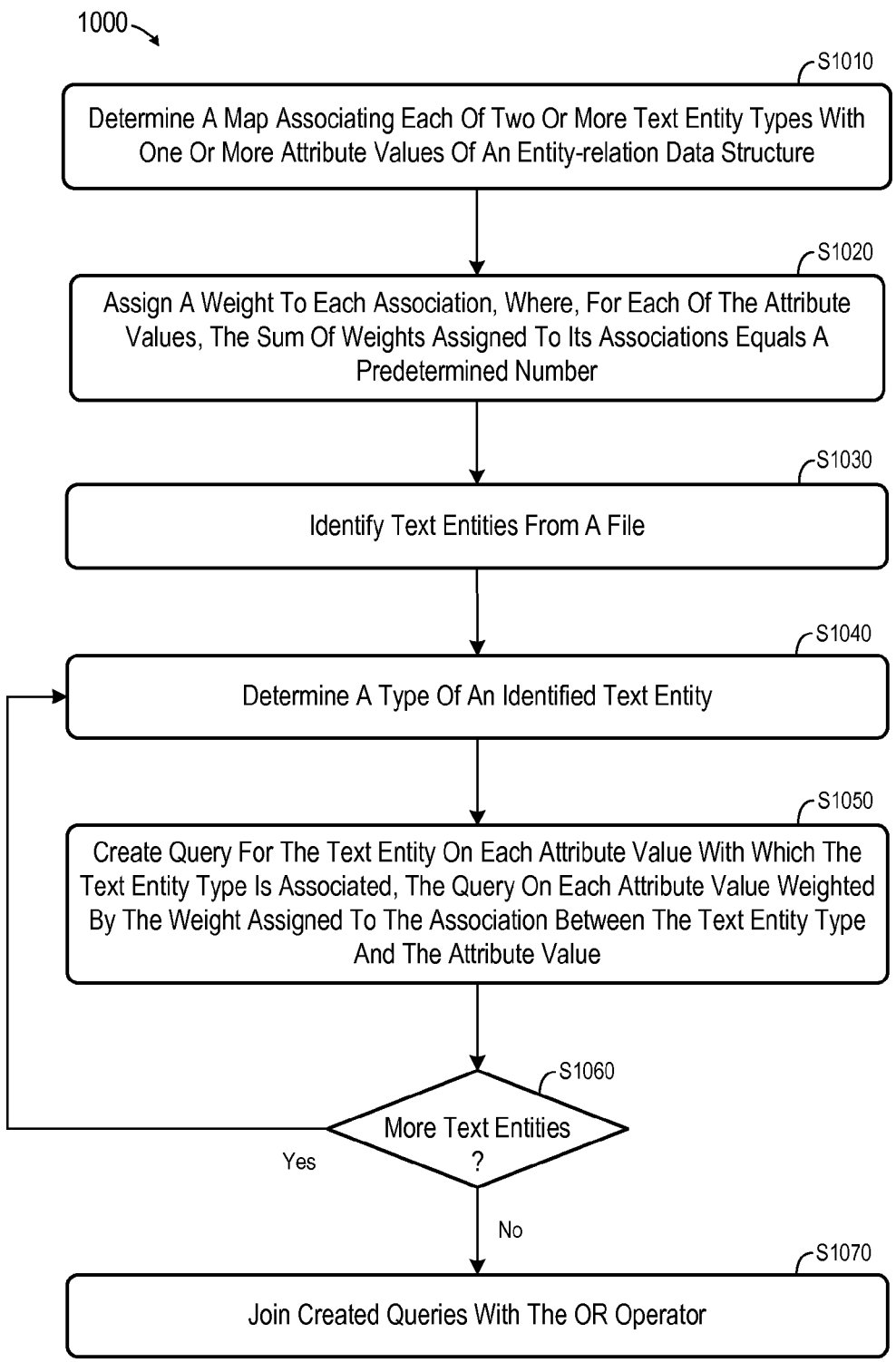
FIG. 10 is a flow diagram of a process according to some embodiments.

FIG. 10 is a flow diagram of process 1000. Generally, process 1000 assigns weights to identified text entities for use in a query consisting of the weighted text entities. Therefore, process 1000 may be combined with process 300, process 400 and/or process 600 according to some embodiments. For example, a single embodiment may incorporate process 300, process 600 and process 1000. In another example, an embodiment may incorporate process 300 and process 1000, but not process 600. Some embodiments may incorporate process 600 and process 1000, but not process 300. Other combinations are also contemplated, for example by substituting process 400 for process 300 in the above-listed possible combinations.

Figure 11:
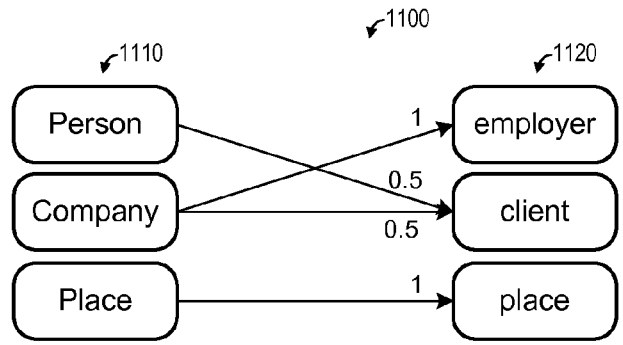
FIG. 11 illustrates an entity type-to-attribute map according to some embodiments.

Initially, at S1010, a map is determined associating each of two or more text entity types with one or more type attribute values of an entity-relation data structure. The text entity types may be determined from a built-in catalog of a text analysis engine as described above. FIG. 11 illustrates such map 1100 according to some embodiments. Each of text entity types 1100 is associated with one or more of type attribute values 1120. Map 1100 may be previously-determined and acquired from a storage device at S1010, or may be generated (e.g., by text analysis engine 510 based on queries of information mesh engine 520) at S1010.

Map 1100 indicates that a Person-type text entity may correspond to a client-type mesh entity. Similarly, a Place-type text entity may correspond to a place-type mesh entity. However, a Company-type text entity may correspond to either an employer-type mesh entity (i.e., a company may be an employer) or to a client-type mesh entity (i.e., a company may be a client). The Company text entity type is therefore associated with both the employer attribute value and the client attribute value.

A weight is assigned to each association of the map at S1020. The weights are assigned such that the sum of weights assigned to the associations of each attribute value equals a predetermined number. According to FIG. 11, the predetermined number is 1.

Figure 12:
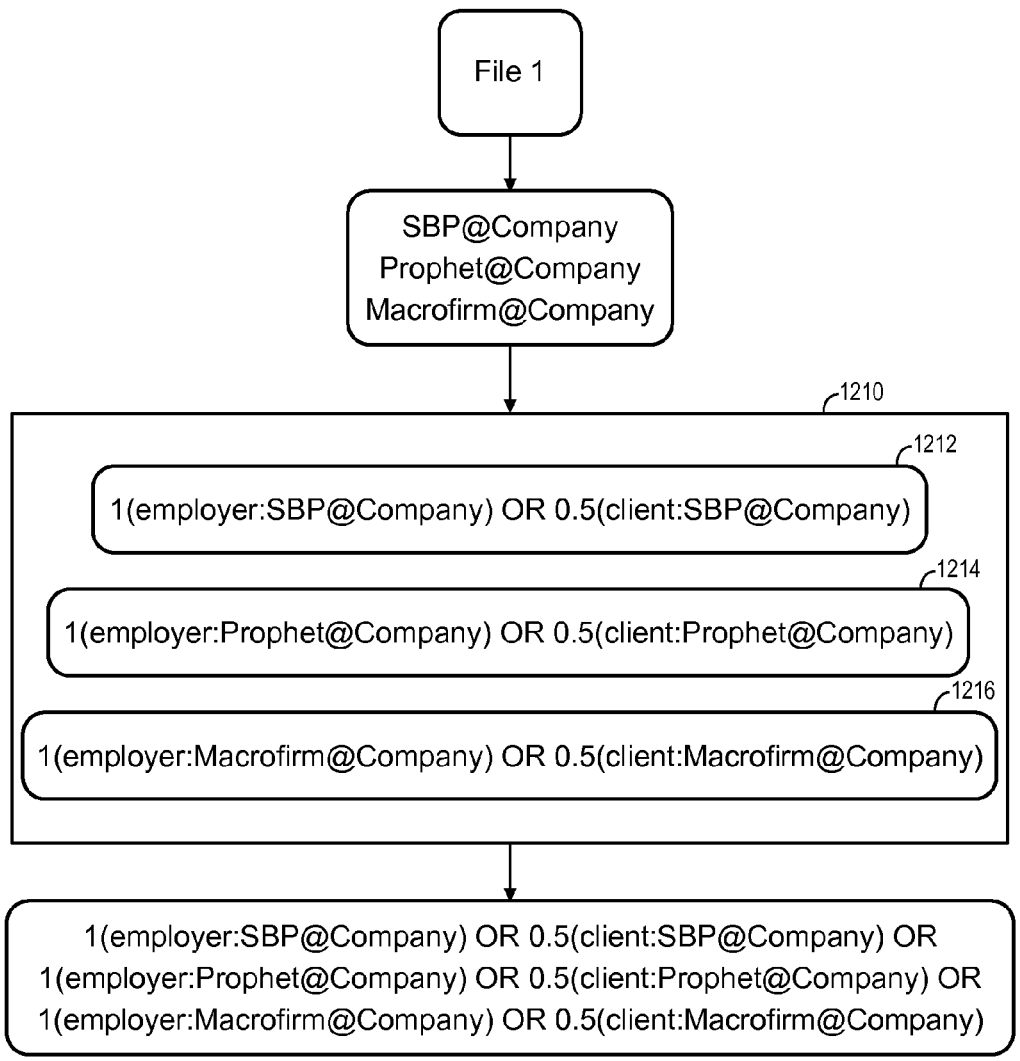
FIG. 12 illustrates creation of a query according to some embodiments.

S1030 operates to extract text entities from a file in any manner discussed herein, and/or that is or becomes known. At S1040, a type of one of the identified text entities is determined. As described above, the text entity-identification process may itself include determination of text entity types. FIG. 12 illustrates the identification of text entities SBP, Prophet and Macrofirm from file 1, as well as determination of their respective text entity types.

A query for an identified text entity is created at S1050. The query is on each attribute value with which the type of the text entity is associated, and the query on each attribute value is weighted by the weight assigned to the association between the type and the attribute value. For example, block 1210 of FIG. 12 illustrates query 1212 created at S1050 according to some examples. Query 1212 corresponds to the text entity SBP, which is associated with the type Company.

Referring to map 1100, the type Company is associated with the employer attribute value and the client attribute value. Accordingly, query 1212 queries on the employer attribute value (e.g., employer:SBP@Company) and on the client attribute value (e.g., client:SBP@Company). Moreover, the weight assigned to the association between Company and employer in map 1100 is 1, and the weight assigned to the association between Company and client is 0.5. Therefore, the weighted query becomes 1(employer: SBP@Company) OR 0.5(client:SBP@Company).

At S1060, it is determined whether additional text entities were determined at S1030. If so, S1040 and S1050 are executed with respect to another identified text entity. Flow cycles between S1040 and S1060 until each identified text entity has been processed. For example, query 1214 of FIG. 12 is created at S1050 based on the identified text entity Oracle, and query 1216 is created at S1050 based on the identified text entity Macrofirm.

Next, at S1070, the created queries are joined using the OR operator. FIG. 12 further illustrates the joining of queries 1212, 1214 and 1216 at S1070 according to some embodiments.

Figure 13:
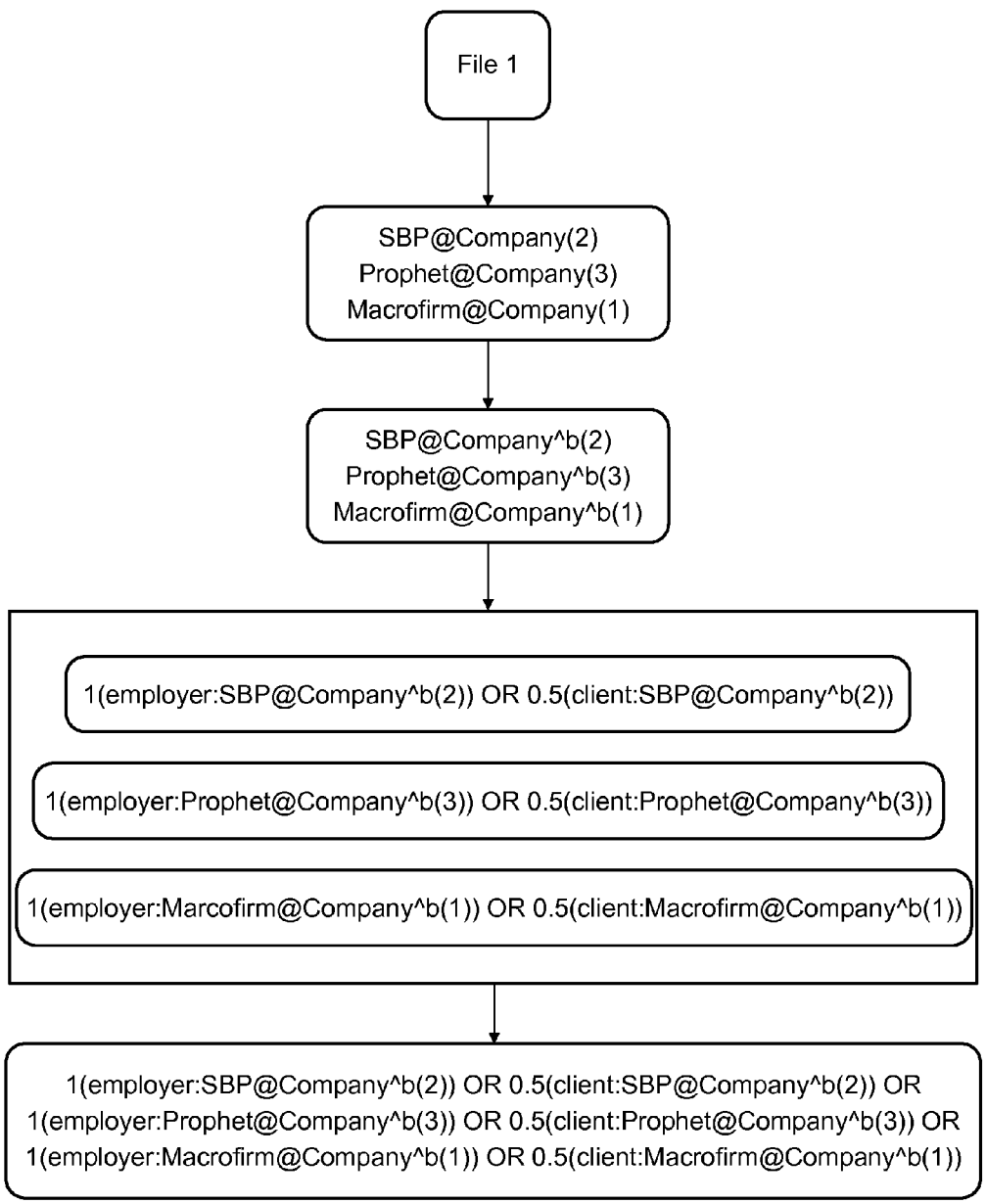
FIG. 13 illustrates creation of a query according to some embodiments.

FIG. 13 illustrates an embodiment which incorporates elements of process 600 and process 1000. As illustrated, process 600 may execute as described above to identify three text entities and their respective number of occurrences in file 1, and then to assign a weight to each text entity at S630 based on its number of occurrences. According to the example, the weighted text entities may be SBP@Company^b(2), Prophet@Company^b(3), and Macrofirm@Company^b(1).

Next, a query is created for each weighted text entity as described with respect to S1050. Accordingly, SBP@Company^b(2) becomes 1(employer: SBP@Company^b(2)) OR 0.5(client:SBP@Company^b(2)), Prophet@Company^b(3) becomes 1(employer: Prophet@Company^b(3)) OR 0.5(client: Prophet@Company^b(3)), and Macrofirm@Company^b(1) becomes 1(employer: Macrofirm@Company^b(1)) OR 0.5 (client: Macrofirm@Company^b(1)). The queries are then joined at S1070 as described above and illustrated in FIG. 13.

Figure 14:
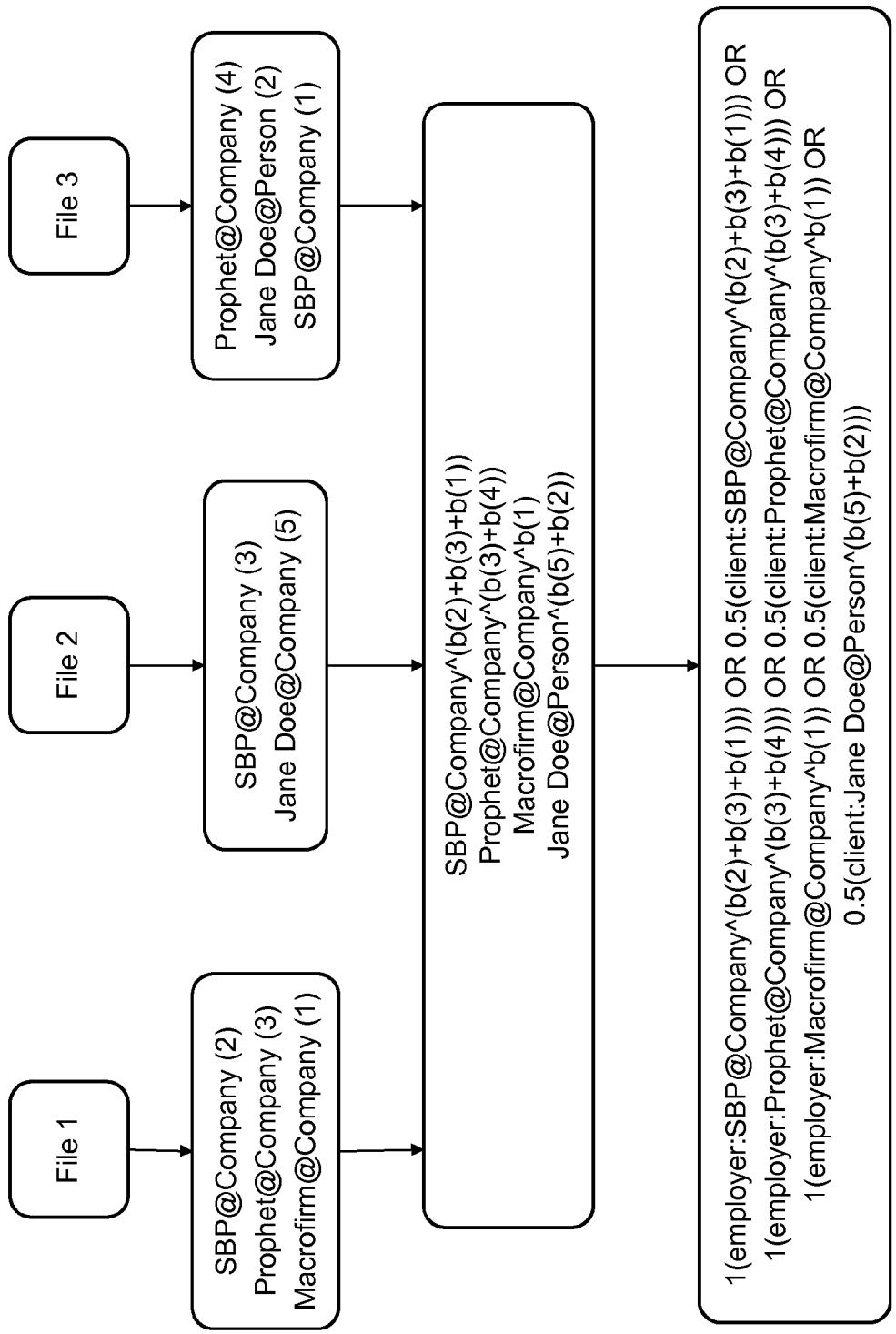
FIG. 14 illustrates creation of a query according to some embodiments.

FIG. 14 illustrates an embodiment which also incorporates elements of process 600 and process 1000 to process multiple files. As illustrated, process 600 executes to identify text entities of files 1, 2 and 3, as well as their respective number of occurrences in each file. At S630, a weight is assigned to each text entity based on its number of occurrences and, at S650, the weights assigned to each text entity are summed. According to the FIG. 14 example, the weighted text entities are SBP@Company^(b(2)+b(3)+b(1)), Prophet@Company^(b(3)+b(4)), Macrofirm@Company^b(1), and Jane Doe@Person^(b(5)+b(2)). As illustrated in FIG. 14, a query is then created for each weighted text entity at S1050, and the queries are joined at S1070.

For any query described herein, including those shown in FIGS. 12-14, some embodiments may add identified text entities without specifying any type, weighting or boost. With respect to FIG. 13, these embodiments may add "OR SBP OR Macrofirm OR Prophet" to the query.

Figure 15:
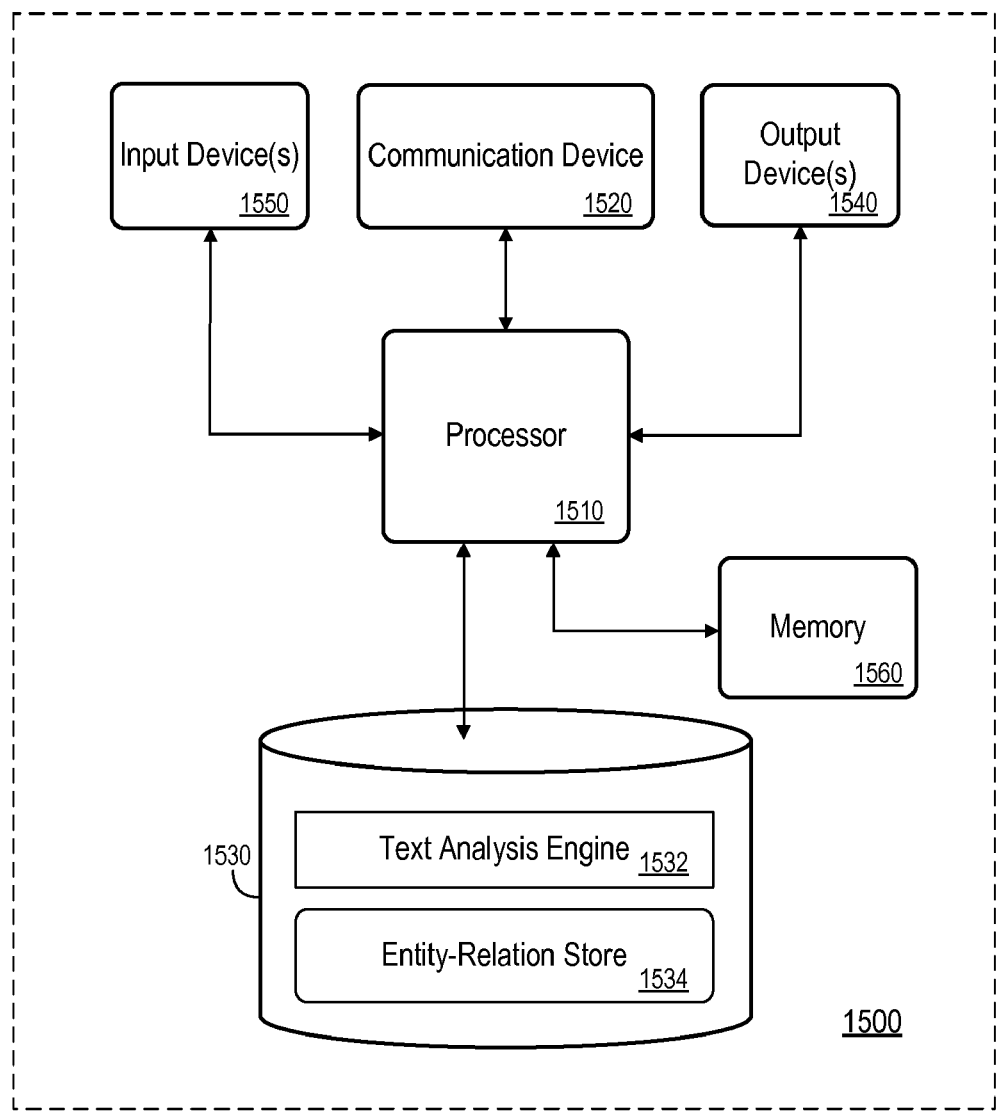
FIG. 15 is a block diagram of an apparatus according to some embodiments.

FIG. 15 is a block diagram of apparatus 1500 according to some embodiments. Apparatus 1500 may comprise a general-purpose computing apparatus and may execute program code to perform any of the functions described herein. Apparatus 1500 may comprise an implementation of elements of environments 100 and/or 500. Apparatus 1500 may include other unshown elements according to some embodiments.

Apparatus 1500 includes processor 1510 operatively coupled to communication device 1520, data storage device 1530, one or more input devices 1540, one or more output devices 1550 and memory 1560. Communication device 1520 may facilitate communication with external devices, such as an external design tool. Input device(s) 1540 may comprise, for example, a keyboard, a keypad, a mouse or other pointing device, a microphone, knob or a switch, an infra-red (IR) port, a docking station, and/or a touch screen. Input device(s) 1540 may be used, for example, to enter information into apparatus 1500. Output device(s) 1550 may comprise, for example, a display (e.g., a display screen) a speaker, and/or a printer.

Data storage device 1530 may comprise any appropriate persistent storage device, including combinations of magnetic storage devices (e.g., magnetic tape, hard disk drives and flash memory), optical storage devices, Read Only Memory (ROM) devices, etc., while memory 1560 may comprise Random Access Memory (RAM).

Text analysis engine 1532 of data storage device 1530 may be executable by processor 1510 to provide functions described herein, including but not limited to processes 300, 400, 600 and 1000. Embodiments are not limited to execution of these functions by a single apparatus. Entity-relation store 1534 may include a plurality of mesh entities, with each of the plurality of mesh entities being associated with a respective name and a respective one or more attributes. Each of the plurality of mesh entities is associated with one or more relations to one or more other ones of the plurality of mesh entities.

Data storage device 1530 may also store data and other program code for providing additional functionality and/or which are necessary for operation thereof, such as device drivers, operating system files, etc.

According to some embodiments, a system comprises: a storage device storing a data structure comprising a plurality of mesh entities, the data structure associating each of the plurality of mesh entities with a respective name and a respective one or more attribute values, and associating each of the plurality of mesh entities with one or more relations to one or more other ones of the plurality of mesh entities; a computing device comprising: a memory system storing processor-executable program code; and a processor to execute the processor-executable program code in order to cause the computing device to: receive a file comprising text; identify text entities from the text; identify first mesh entities of the plurality of mesh entities based on the identified text entities; determine, for each of the first mesh entities, a name and one or more attribute values; and determine a relevance associated with each identified text entity based on the determined name and one or more attribute values, the system further comprising: a map associating each of two or more text entity types with one or more attributes of the data structure, and assigning a weight to each association between a text entity type and an attribute, where, for each of the attributes, a sum of weights assigned to its associations equals a predetermined number, the processor further to execute the processor-executable program code in order to cause the computing device to: for each of n ones of the identified text entities associated with n highest relevance: determine a type of the identified text entity; create a query for the identified text entity on each of one or more attributes with which the determined type is associated, where the query on each attribute is weighted by the weight assigned to the association between the type and the attribute; determine a number of occurrences of the identified text entity in the file; and weight the one or more weighted queries for the identified text entity based on the number of occurrences of the identified text entity in the file; and join the weighted one or more weighted queries using the OR operator, wherein n is an integer.

According to some embodiments, a non-transitory medium stores processor-executable program code, the program code executable by a device to: receive a file comprising text; identify text entities from the text; identify, based on the identified text entities, first mesh entities from a data structure comprising a plurality of mesh entities, the data structure associating each of the plurality of mesh entities with a respective name and a respective one or more attribute values, and associating each of the plurality of mesh entities with one or more relations to one or more other ones of the plurality of mesh entities; determine, for each of the first mesh entities, a name and one or more attribute values; and determine a relevance associated with each identified text entity based on the determined name and one or more attribute values; determine a map associating each of two or more text entity types with one or more attribute values of the data structure, and assigning a weight to each association between a text entity type and an attribute value, where, for each of the attribute values, a sum of weights assigned to its associations equals a predetermined number; for each of n ones of the identified text entities associated with n highest relevance: determine a type of the identified text entity; create a query for the identified text entity on each of one or more attribute values with which the determined text entity type is associated, where the query on each attribute is weighted by the weight assigned to the association between the text entity type and the attribute value; determine a number of occurrences of the identified text entity in the file; and weight the one or more weighted queries for the identified text entity based on the number of occurrences of the identified text entity in the file; and join the weighted one or more weighted queries using the OR operator; wherein n is an integer.

According to some embodiments, a method implemented by a computing system comprises: receiving a file comprising text; identifying text entities from the text; identifying, based on the identified text entities, first mesh entities from a data structure comprising a plurality of mesh entities, the data structure associating each of the plurality of mesh entities with a respective name and a respective one or more attribute values, and associating each of the plurality of mesh entities with one or more relations to one or more other ones of the plurality of mesh entities; determining, for each of the first mesh entities, a name and one or more attribute values; and determining a relevance associated with each identified text entity based on the determined name and one or more attribute values; determining a map associating each of two or more text entity types with one or more attribute values of the data structure, and assigning a weight to each association between a text entity type and an attribute value, where, for each of the attribute values, a sum of weights assigned to its associations equals a predetermined number; for each of n ones of the identified text entities associated with n highest relevance: determining a type of the identified text entity; creating a query for the identified text entity on each of one or more attribute values with which the determined text entity type is associated, where the query on each attribute value is weighted by the weight assigned to the association between the text entity type and the attribute value; determining a number of occurrences of the identified text entity in the file; and weighting the one or more weighted queries for the identified text entity based on the number of occurrences of the identified text entity in the file; and joining the weighted one or more weighted queries using the OR operator; wherein n is an integer.

Embodiments described herein are solely for the purpose of illustration. Those in the art will recognize other embodiments may be practiced with modifications and alterations to that described above.

What is claimed is:
1. A system comprising:
a storage device storing a data structure comprising a plurality of mesh entities, the data structure associating each of the plurality of mesh entities with a respective name and a respective one or more attribute values, and associating each of the plurality of mesh entities with one or more relations to one or more other ones of the plurality of mesh entities;
a computing device comprising:
a memory system storing processor-executable program code; and
a processor to execute the processor-executable program code in order to cause the computing device to:
receive a file comprising text;
identify text entities from the text;
identify first mesh entities of the plurality of mesh entities based on the identified text entities;
determine, for each of the first mesh entities, a name and one or more attribute values; and
determine a relevance associated with each identified text entity based on the determined name and one or more attribute values;
the system further comprising:
a map associating each of two or more text entity types with one or more attributes of the data structure, and assigning a weight to each association between a text entity type and an attribute, where, for each of the attributes, a sum of weights assigned to its associations equals a predetermined number,
the processor further to execute the processor-executable program code in order to cause the computing device to:
for each of n ones of the identified text entities associated with n highest relevance, wherein n is an integer:
determine a type of the identified text entity;
create a query for the identified text entity on each of one or more attributes with which the determined type is associated, where the query on each attribute is weighted by the weight assigned to the association between the type and the attribute;

determine a number of occurrences of the identified text entity in the file; and weight the one or more weighted queries for the identified text entity based on the number of occurrences of the identified text entity in the file; and join the weighted one or more weighted queries using the OR operator.

2. A system according to claim 1, wherein determining the relevance associated with each identified text entity based on the determined name and one or more attribute values comprises:

for each identified text entity, associating a first relevance score with the identified text entity if the identified text entity matches a name of one or more of the first mesh entities, associating a second relevance score with the identified text entity if the identified text entity matches an attribute value of one or more of the first mesh entities and does not match a name of one or more of the first mesh entities, and associating a third relevance score with the identified text entity if the identified text entity does not match an attribute value of one or more of the first mesh entities and does not match a name of one or more of the first mesh entities.

3. A system according to claim 1, wherein the map associating each of two or more text entity types with one or more attributes of the data structure, and assigning a weight to each association between a text entity type and an attribute, where, for each of the attributes, a sum of weights assigned to its associations equals a predetermined number comprises:

a map associating each of two or more text entity types with one or more attribute values of the data structure, and assigning a weight to each association between a text entity type and an attribute value, where, for each of the attribute values, a sum of weights assigned to its associations equals a predetermined number; and wherein the create a query for the identified text entity on each of one or more attributes with which the determined type is associated, where the query on each attribute is weighted by the weight assigned to the association between the type and the attribute comprises:

create a query for the identified text entity on each of one or more attribute values with which the determined text entity type is associated, where the query on each attribute value is weighted by the weight assigned to the association between the text entity type and the attribute value.

4. A system comprising:

a storage device storing a data structure comprising a plurality of mesh entities, the data structure associating each of the plurality of mesh entities with a respective name and a respective one or more attribute values, and associating each of the plurality of mesh entities with one or more relations to one or more other ones of the plurality of mesh entities;

a computing device comprising:
a memory system storing processor-executable program code; and
a processor to execute the processor-executable program code in order to cause the computing device to:
receive two or more files comprising text;
identify text entities from the text;
identify first mesh entities of the plurality of mesh entities based on the identified text entities;
determine, for each of the first mesh entities, a name and one or more attribute values; and
determine a relevance associated with each identified text entity based on the determined name and one or more attribute values;

the system further comprising:
a map associating each of two or more text entity types with one or more type attribute values of the data structure, and assigning a weight to each association between a text entity type and a type attribute value, where, for each of the attribute values, a sum of weights assigned to its associations equals a predetermined number, the processor further to execute the processor-executable program code in order to cause the computing device to:
for each of n ones of the identified text entities associated with n highest relevance, wherein n is an integer:
determine a type of the identified text entity;
create a query for the identified text entity on each of one or more attribute values with which the determined text entity type is associated, where the query on each attribute value is weighted by the weight assigned to the association between the text entity type and the attribute value;
determine a number of occurrences of the identified text entity in the files; and
weight the one or more weighted queries for the identified text entity based on one or more partial weights, each partial weight based on the number of occurrences of the identified text entity in a respective one of the files; and
join the weighted one or more weighted queries using the OR operator.

5. A non-transitory medium storing processor-executable program code, the program code executable by a device to:
receive a file comprising text;
identify text entities from the text;
identify, based on the identified text entities, first mesh entities from a data structure comprising a plurality of mesh entities, the data structure associating each of the plurality of mesh entities with a respective name and a respective one or more attribute values, and associating each of the plurality of mesh entities with one or more relations to one or more other ones of the plurality of mesh entities;
determine, for each of the first mesh entities, a name and one or more attribute values; and
determine a relevance associated with each identified text entity based on the determined name and one or more attribute values;
determine a map associating each of two or more text entity types with one or more attribute values of the data structure, and assigning a weight to each association between a text entity type and an attribute value, where, for each of the attribute values, a sum of weights assigned to its associations equals a predetermined number;
for each of n ones of the identified text entities associated with n highest relevance, wherein n is an integer:
determine a type of the identified text entity;
create a query for the identified text entity on each of one or more attribute values with which the determined text entity type is associated, where the query on each attribute is weighted by the weight assigned to the association between the text entity type and the attribute value;

determine a number of occurrences of the identified text entity in the file; and weight the one or more weighted queries for the identified text entity based on the number of occurrences of the identified text entity in the file; and join the weighted one or more weighted queries using the OR operator.

6. A non-transitory medium according to claim 5, wherein determination of the relevance associated with each identified text entity based on the determined name and one or more attribute values comprises:

for each identified text entity, association of a first relevance score with the identified text entity if the identified text entity matches a name of one or more of the first mesh entities, association of a second relevance score with the identified text entity if the identified text entity matches an attribute value of one or more of the first mesh entities and does not match a name of one or more of the first mesh entities, and association of a third relevance score with the identified text entity if the identified text entity does not match an attribute value of one or more of the first mesh entities and does not match a name of one or more of the first mesh entities.

7. A non-transitory medium storing processor-executable program code, the program code executable by a device to:

receive two or more files comprising text;

identify text entities from the text;

identify, based on the identified text entities, first mesh entities from a data structure comprising a plurality of mesh entities, the data structure associating each of the plurality of mesh entities with a respective name and a respective one or more attribute values, and associating each of the plurality of mesh entities with one or more relations to one or more other ones of the plurality of mesh entities;

determine, for each of the first mesh entities, a name and one or more attribute values; and determine a relevance associated with each identified text entity based on the determined name and one or more attribute values;

determine a map associating each of two or more text entity types with one or more attribute values of the data structure, and assigning a weight to each association between a text entity type and an attribute value, where, for each of the attribute values, a sum of weights assigned to its associations equals a predetermined number;

for each of n ones of the identified text entities associated with n highest relevance, wherein n is an integer:

determine a type of the identified text entity;

create a query for the identified text entity on each of one or more attribute values with which the determined type is associated, where the query on each attribute value is weighted by the weight assigned to the association between the text entity type and the attribute value;

determine a number of occurrences of the identified text entity in the files; and weight the one or more weighted queries for the identified text entity based on one or more partial weights, each partial weight based on the number of occurrences of the identified text entity in a respective one of the files; and join the weighted one or more weighted queries using the OR operator.

8. A method implemented by a computing system in response to execution of program code by a processor of the computing system, the method comprising:

receiving a file comprising text;

identifying text entities from the text;

identifying, based on the identified text entities, first mesh entities from a data structure comprising a plurality of mesh entities, the data structure associating each of the plurality of mesh entities with a respective name and a respective one or more attribute values, and associating each of the plurality of mesh entities with one or more relations to one or more other ones of the plurality of mesh entities;

determining, for each of the first mesh entities, a name and one or more attribute values; and determining a relevance associated with each identified text entity based on the determined name and one or more attribute values;

determining a map associating each of two or more text entity types with one or more attribute values of the data structure, and assigning a weight to each association between a text entity type and an attribute value, where, for each of the attribute values, a sum of weights assigned to its associations equals a predetermined number;

for each of n ones of the identified text entities associated with n highest relevance, wherein n is an integer:

determining a type of the identified text entity;

creating a query for the identified text entity on each of one or more attribute values with which the determined text entity type is associated, where the query on each attribute value is weighted by the weight assigned to the association between the text entity type and the attribute value;

determining a number of occurrences of the identified text entity in the file; and weighting the one or more weighted queries for the identified text entity based on the number of occurrences of the identified text entity in the file; and joining the weighted one or more weighted queries using the OR operator.

9. A method according to claim 8, wherein determining the relevance associated with each identified text entity based on the determined name and one or more attribute values comprises:

for each identified text entity, associating a first relevance score with the identified text entity if the identified text entity matches a name of one or more of the first mesh entities, associating a second relevance score with the identified text entity if the identified text entity matches an attribute value of one or more of the first mesh entities and does not match a name of one or more of the first mesh entities, and associating a third relevance score with the identified text entity if the identified text entity does not match an attribute value of one or more of the first mesh entities and does not match a name of one or more of the first mesh entities.

10. A method implemented by a computing system in response to execution of program code by a processor of the computing system, the method comprising:

receiving two or more files comprising text;

identifying text entities from the text;

identifying, based on the identified text entities, first mesh entities from a data structure comprising a plurality of mesh entities, the data structure associating each of the plurality of mesh entities with a respective name and a respective one or more attribute values, and associating each of the plurality of mesh entities with one or more relations to one or more other ones of the plurality of mesh entities;

determining, for each of the first mesh entities, a name and one or more attribute values; and determining a relevance associated with each identified text entity based on the determined name and one or more attribute values;

determining a map associating each of two or more text entity types with one or more attribute values of the data structure, and assigning a weight to each association between a text entity type and an attribute value, where, for each of the attribute values, a sum of weights assigned to its associations equals a predetermined number;

for each of n ones of the identified text entities associated with n highest relevance, wherein n is an integer:
  determining a type of the identified text entity;
  creating a query for the identified text entity on each of one or more attribute values with which the determined text entity type is associated, where the query on each attribute value is weighted by the weight assigned to the association between the text entity type and the attribute value;
  determining a number of occurrences of the identified text entity in the files; and
  weighting the one or more weighted queries for the identified text entity based on one or more partial weights, each partial weight based on the number of occurrences of the identified text entity in a respective one of the files; and joining the weighted one or more weighted queries using the OR operator.

* * * * *